United States Patent [19]

Ezuriko

[11] Patent Number: 5,671,275
[45] Date of Patent: Sep. 23, 1997

[54] PROTECTION OF SOFTWARE PROGRAMS STORED IN READ-ONLY MEMORY FROM UNAUTHORIZED ACCESS

[75] Inventor: Hiroshi Ezuriko, Tokyo, Japan

[73] Assignee: NEC Corporation, Tokyo, Japan

[21] Appl. No.: 430,375

[22] Filed: Apr. 28, 1995

[30] Foreign Application Priority Data

Apr. 28, 1994 [JP] Japan ..................... 6-111675

[51] Int. Cl.$^6$ ..................................... H04L 9/00
[52] U.S. Cl. ................... 380/4; 380/25; 380/49
[58] Field of Search .................. 380/3, 4, 49, 23, 380/25

[56] References Cited

U.S. PATENT DOCUMENTS

| | | | |
|---|---|---|---|
| 4,319,079 | 3/1982 | Best | 178/22.09 |
| 5,065,429 | 11/1991 | Lang | 380/4 |
| 5,224,166 | 6/1993 | Hartmann, Jr. | 380/50 |
| 5,371,792 | 12/1994 | Asai et al. | 380/4 |
| 5,416,840 | 5/1995 | Cane et al. | 380/4 |
| 5,457,746 | 10/1995 | Dolphin | 380/4 |
| 5,555,304 | 9/1996 | Hasebe et al. | 380/4 |

FOREIGN PATENT DOCUMENTS

| | | |
|---|---|---|
| 0 083 209 | 7/1983 | European Pat. Off. . |
| 0 449 256 A2 | 10/1991 | European Pat. Off. . |
| WO 83/04356 | 12/1983 | WIPO . |

*Primary Examiner*—David C. Cain
*Attorney, Agent, or Firm*—Foley & Lardner

[57] ABSTRACT

In a microprocessor-based controller, scrambled program data words are stored in a read-only memory and user information is stored in a random-access memory. A data converter is connected in the data bus between the microprocessor and the memories for descrambling data words when the ROM is accessed to produce a replica of original program data words and applying the replica to the microprocessor for operating the controller. The data converter simply applies data words to the microprocessor without descrambling when the RAM is accessed. The scrambled program data words in the read-only memory may be divided into multiple data blocks, each of which is a scrambled form of the original program data words with each of multiple keywords defined respectively for the data blocks. A modulo-2 adder is provided for summing each of the keywords with the scrambled program data words of a corresponding data block.

15 Claims, 4 Drawing Sheets

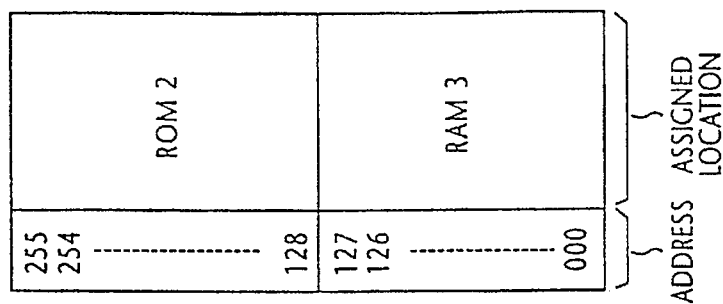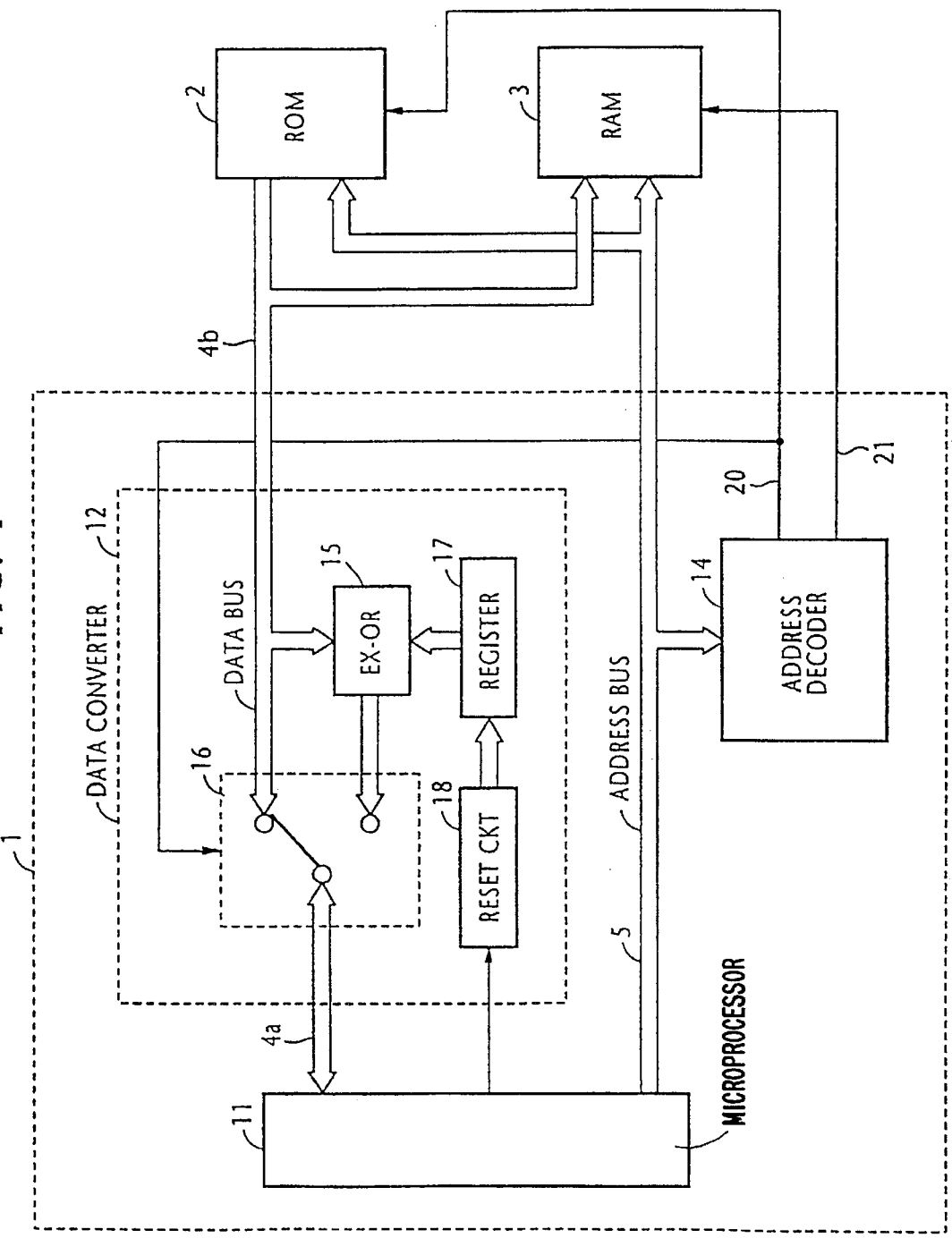

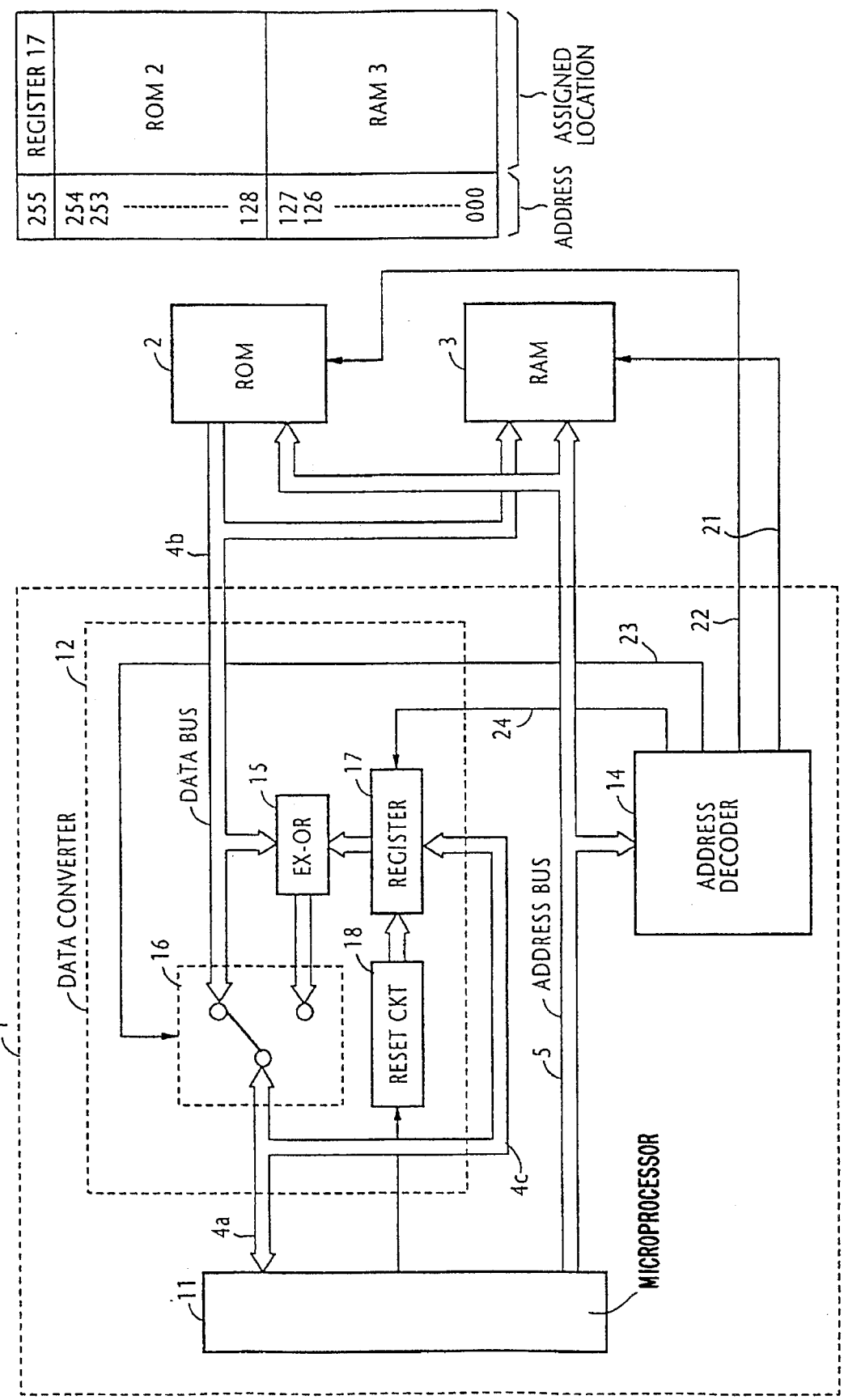

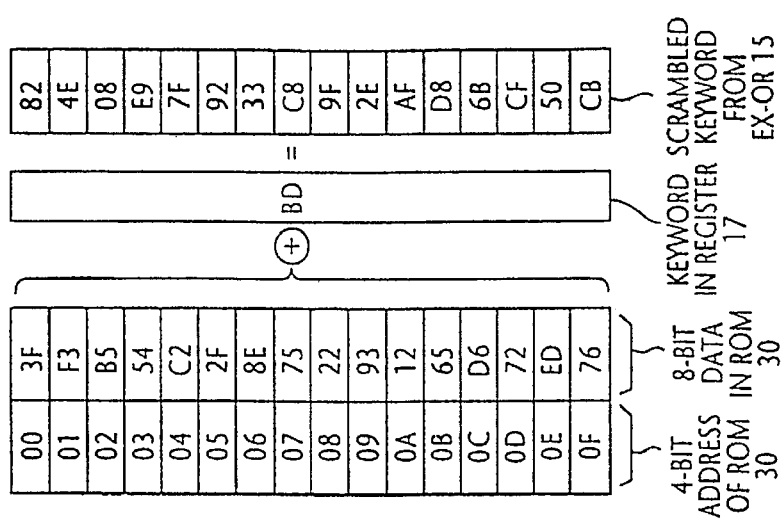
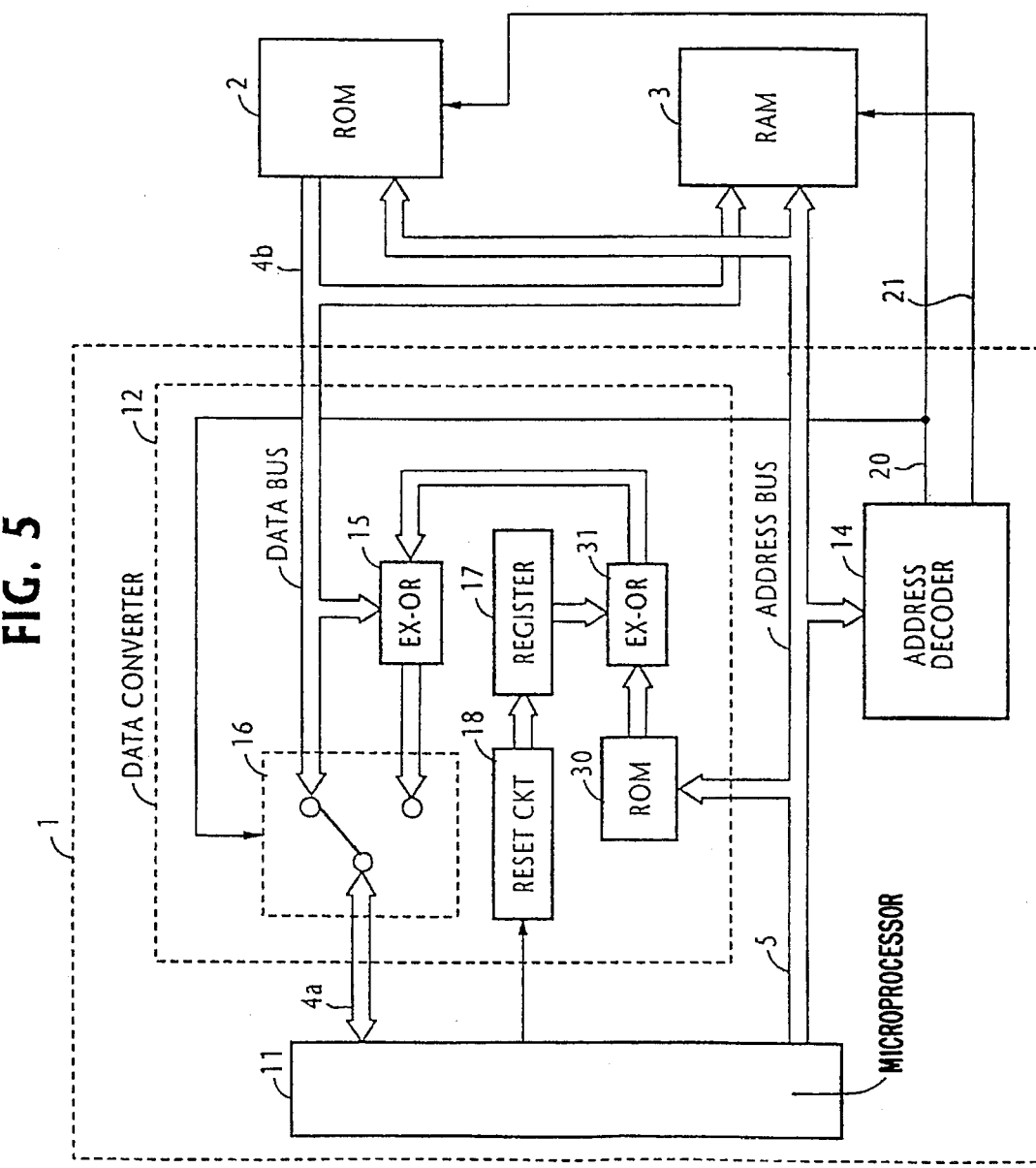

PROTECTION OF SOFTWARE PROGRAMS STORED IN READ-ONLY MEMORY FROM UNAUTHORIZED ACCESS

BACKGROUND OF THE INVENTION

1. Field of the Invention

The present invention relates to protection of software programs stored in read-only memories from unauthorized access.

2. Description of the Related Art

Recent advances in electronics and related arts show a general tendency toward placing more important emphasis on software technologies than on hardware to create new features, products and innovations. The read-only memory of a microprocessor-based controller is the storage location of the software in which innovative ideas are embodied as a sequence of instructions programmed in a form that can be processed by the microprocessor. If an unauthorized attempt is made to read and analyze the contents of a read-only memory in what is called "reverse engineering", the important "know-how" of a corporation which is attained after years of development effort can be easily duplicated at lower costs.

SUMMARY OF THE INVENTION

It is therefore an object of the present invention to protect software programs stored in read-only memories from unauthorized access.

According to the present invention, there is provided a controller comprising a microprocessor and a read-only memory for storing converted program data words. A data converter is connected between the microprocessor and the read-only memory for reconverting the converted program data words from the read-only memory according to a predetermined rule into a replica of original program data words which can be processed by the microprocessor and applying the replica of original program data words to the microprocessor for operating the controller.

According to a specific aspect, the present invention provides a controller which comprises a microprocessor, a read-only memory for storing scrambled program data words and a random-access memory. Information signals between the microprocessor and the memories are transported over a data bus and address signals from the microprocessor to the memories are transported over an address bus. A data converter is connected in the data bus for descrambling data words when the read-only memory is accessed through the address bus to produce a replica of original program data words and applying the replica to the microprocessor for operating the controller, and applying data words to the microprocessor without descrambling the data words when the random-access memory is accessed through the address bus.

The scrambled program data words in the read-only memory may be divided into a plurality of data blocks, each of which is a scrambled form of the original program data words with each of multiple keywords defined respectively for the data blocks. The data converter comprises keyword generating means for generating the multiple keywords, and a modulo-2 adder for summing each of the generated keywords with the scrambled program data words of a corresponding one of the data blocks to produce the replica of original program data words.

BRIEF DESCRIPTION OF THE DRAWINGS

The present invention will be described in further detail with reference to the accompanying drawings, in which:

FIG. 1 is a block diagram of a microprocessor-based controller according to a first embodiment of the present invention;

FIG. 2 is an illustration of address codes assigned to memories;

FIG. 3 is a block diagram of a microprocessor-based controller according to a second embodiment of the present invention;

FIG. 4 is an illustration of address codes assigned to register and memories;

FIG. 5 is a block diagram of a modification of the first embodiment of the present invention;

FIG. 6 is an illustration of 8-bit data stored in respective locations of a second read-only memory and corresponding 8-bit keywords generated by scrambling the 8-bit words with an original keyword in a register.

DETAILED DESCRIPTION

Figure 7:
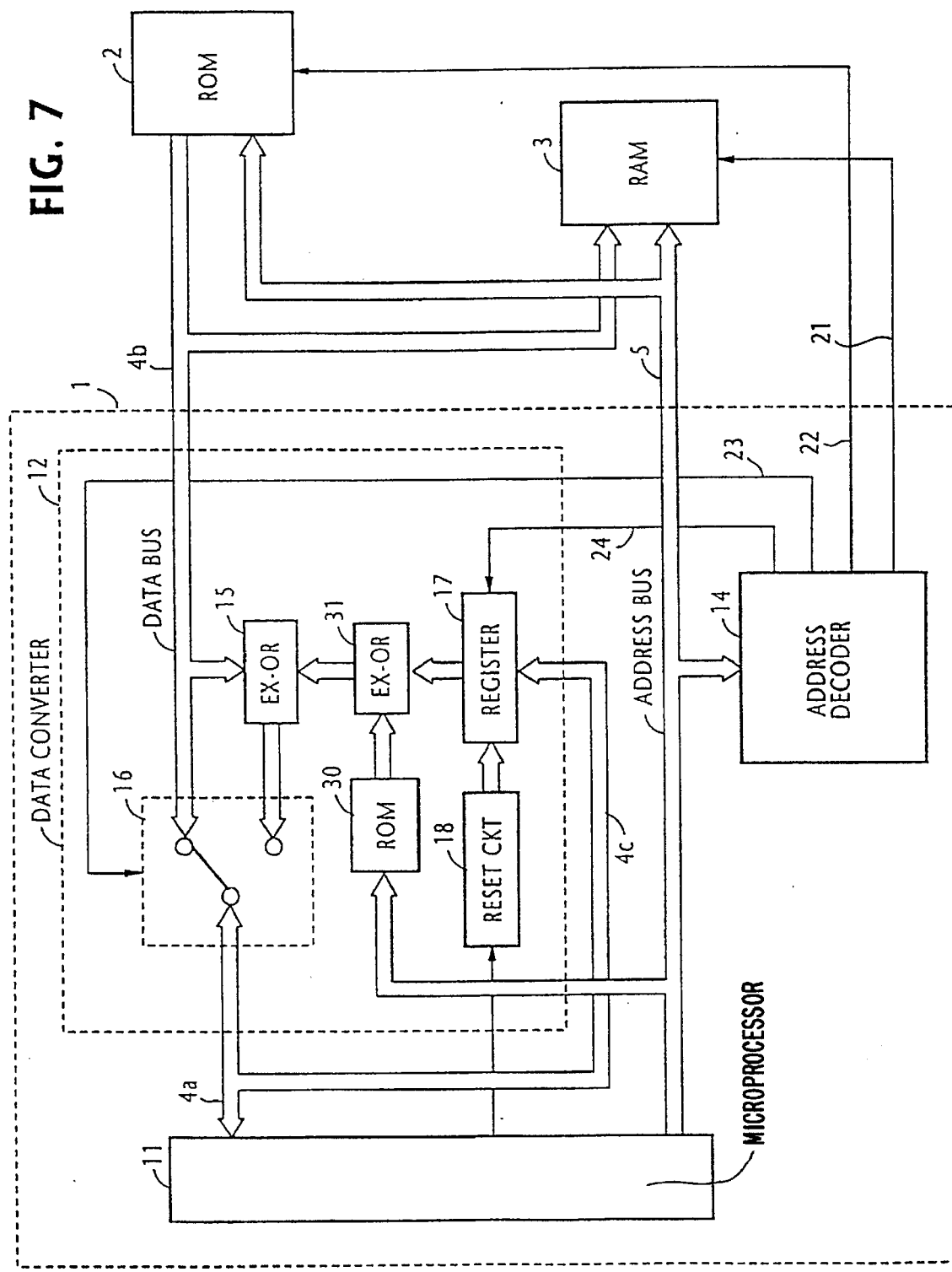
FIG. 7 is a block diagram of a modification of the second embodiment of the present invention using the keyword generating means of FIG. 5.

Referring now to FIG. 1, there is shown a microprocessor-based controller according to a first embodiment of the present invention. The controller includes an LSI chip 1, a read-only memory (ROM) 2 and a random access memory (RAM) 3. On the LSI chip 1 are provided a microprocessor 11 and a data converter 12, and an address decoder 14. The microprocessor 1 and ROM 2 and RAM 3 are interconnected via an 8-bit data bus which is separated into bus sections 4a and 4b. Address data from the microprocessor is supplied over an 8-bit address bus 5 to both of the ROM 2 and RAM 3. One of the ROM 2 and RAM 3 is selectively enabled by a signal on leads 20 and 21 supplied from the address decoder 14 that is connected to the address bus 5.

The control data stored in ROM 2 is a scramble of original 8-bit data words which are generated by a software program intended to be processed by the microprocessor 1 with an 8-bit scrambling keyword which is only known to authorized personnel. Data converter 12 includes an 8-bit exclusive-OR gate 15 which provides a modulo-2 summation on the scrambled 8-bit data supplied from ROM 2 via data bus section 4b and an 8-bit keyword stored in a register 17 in which the keyword is loaded from a reset circuit 18 which is activated by microprocessor 11 when the controller is initialized at startup.

As illustrated in FIG. 2, the addresses #000 to #127 of the 8-bit address data from microprocessor 11 are assigned to RAM 3 and the addresses ·128 to #255 of the address data are assigned to ROM 2. Address decoder 14 examines the address data and determines which one of ROM 2 and RAM 3 is to be addressed. If the address location is in ROM 2, address decoder 14 activates a line 20 that leads to ROM 2 as well as to the switch 16 of data converter 12 so that ROM 2 is enabled and the switch 16 is changed to the lower position. If the RAM 3 is addressed, a line 21 i activated to enable the RAM 3 to provide a read/write operation with microprocessor 11 through data bus section 4a, the upper position of switch 16 and data bus section 4b.

The keyword stored in the register 17 is exactly the same as the one with which the original software data was scrambled. Exclusive-OR gate 15 provides a process that is inverse to the scrambling process by descrambling the ROM 2 data into the original form. Therefore, when the ROM 2 is enabled, the ROM 2 data is descrambled by the exclusive-OR gate 15 with the keyword of register 17 and supplied through the lower position of an 8-port switch 16 and data bus section 4a to microprocessor 11. For example, if an original 8-bit data word is $C3_{hex}$ (in hexadecimal notation) and the keyword is $BD_{hex}$, the corresponding data stored in ROM 2 is $7E_{hex}$ which is reconverted to $C3_{hex}$ by the exclusive-OR gate 15 with the keyword in the register 17 to be processed by microprocessor 11. When the RAM 3 is in a read/write mode, the switch 16 is in the upper position so that all data to be written into and read out of RAM 3 are processed in the usual manner.

It will be seen, therefore, if an unauthorized attempt is made to decode the software program of ROM 2 using the open specifications of microprocessor 11, the result is a fruitless effort in so far as the keyword is kept secret.

FIG. 3 is an illustration of a modified embodiment of the present invention. According to this modification, the software data in ROM 2 is divided into blocks and scrambled with respective keywords to enhance the security of the stored program against unauthorized access even through the initial keyword in register 17 is known to unauthorized personnel. In FIG. 3, the first keyword is loaded into the register 17 from the reset circuit 18 at the startup of the controller in the same manner as in the previous embodiment. The second and thereafter keywords of unscrambled format are stored in the starting points of the respective blocks and each of these unscrambled keywords is latched into the register 17.

For this purpose, the #255 address of the 8-bit address data is assigned to register 17, instead of to ROM 2, as shown in FIG. 4. When reading a keyword from a given block of ROM 2, microprocessor 11 issues an address code specifying the location of the keyword in ROM 2, and address decoder 14, on decoding the address code, activates a line 22 leading to the ROM 2 for enabling it, and deactivates a line 23 leading to switch 16 for moving it to the upper position. Thus, the keyword of the given block is read out of ROM 2 into microprocessor 11 via data bus sections 4a and 4b. Then, the microprocessor 11 issues an address code specifying the address #255 of register 17 and supplies the received keyword to the register 17 via a data bus section 4c. On decoding the address code, the address decoder 14 activates a line 24 leading to register 17 for enabling it to latch the keyword from microprocessor 11.

During a subsequent read operation on the scrambled data of the given block, microprocessor 11 generates address codes specifying the storage locations of the block to allow address decoder 14 to activate the line 23 and deactivate the line 24. Thus, switch 16 is caused to move to the lower position and the register 17 is disabled to prevent it from being overwritten with a scrambled word, while keeping the line 22 activated. The scrambled software data of each block, read from ROM 2 in this way, is descrambled by exclusive-OR gate 15 with the corresponding keyword in register 17 and supplied through data bus section 4a to microprocessor 11.

Read/write operations of RAM 3 are carried out in the same manner as in the previous embodiment when the address data on bus 5 is decoded as corresponding to one of #000 to #127.

Illustrated in FIG. 5 is a further modification of the embodiment of FIG. 1 to enhance its security against unauthorized access. According to this modified embodiment, the data converter 12 includes an internal ROM 30 with a capacity of 8 bits×16 and an exclusive-OR gate 31. The internal ROM 30 stores sixteen scrambling words and is connected to the address bus 5 to read one of the scrambling words in accordance with the 8-bit address code from microprocessor 11. The scrambling word from ROM 30 is applied to the exclusive-OR gate 31 where it is used to scramble the keyword stored in the register 17 to produce one of sixteen scrambled keywords. As illustrated in FIG. 6, the ROM 30 has a 4-bit address for specifying one of the stored sixteen scrambling words and this 4-bit address corresponds to the lower 4-bits of the 8-bit address code on the address bus 5. If the 8-bit keyword stored in register 17 is $BD_{hex}$ (in hexadecimal notation) and if ROM 30 is addressed with a 4-bit address code $03_{oct}$ (in octal notation) an 8-bit scrambling word $54_{hex}$ is read out of ROM 30 and modulo-2 summed with the keyword $BD_{hex}$ to produce a scrambled keyword $E9_{hex}$. The scrambled keyword is supplied to the exclusive-OR gate 15 where it is modulo-2 summed with data words read from ROM 2.

It is seen therefore that each of the original 8-bit data words directly processed by microprocessor 11 must be scrambled in advance with a corresponding one of the same sixteen keywords as those provided by the exclusive-OR gate 15 (see FIG. 6), depending on the storage location of the data word in ROM 2. For example, if an original unscrambled data word corresponding to storage location $03_{oct}$ of ROM 2 is $D4_{hex}$, it is scrambled (modulo-2 summed) with keyword $E9_{hex}$ to produce a scrambled data word $3D_{hex}$. This scrambled keyword is stored into the $03_{oct}$ location of ROM 2. When the scrambled $3D_{hex}$ data word is read out of ROM 2 in response to an address code $03_{oct}$ during operation, ROM 30 is addressed to read the corresponding scrambling word $54_{hex}$ which is then modulo-2 summed in exclusive-OR gate 31 with the keyword $BD_{hex}$ in register 17 to produce the keyword $E9_{hex}$. This keyword is applied to exclusive-OR gate 15 to descramble the scrambled $3D_{hex}$ data word into the original data word $D4_{hex}$ for coupling through the lower position of switch 16 to microprocessor 11.

It is seen therefore that the software protection capability of the present invention can be further enhanced by combining the features of the embodiment of FIG. 3 with the ROM 30 and exclusive-OR gate 31 of FIG. 5 as illustrated in FIG. 7. In FIG. 7, the ROM 2 is divided into blocks as in the case of FIG. 3 and the keyword register 17 is updated with a keyword corresponding to the block in ROM 2 being accessed in the same manner as that described with reference to FIG. 3. If the ROM 2 is divided into N blocks, N+1 keywords will be stored in register 17 and modulo-2 summed by exclusive-OR gate 31 with the sixteen scrambling words from ROM 30 to produce N×16 scrambled keywords to descramble the scrambled data words from ROM 2 by exclusive-OR gate 15.

What is claimed is:

1. A controller comprising
a microprocessor;
a read-only memory for storing converted program data words; and
a data converter connected between said microprocessor and said read-only memory, said data converter including a register storing a predetermined keyword for reconverting the converted program data words from the read-only memory according to the stored predetermined keyword into a replica of original program data words which can be processed by the microprocessor, wherein said data converter provides said replica of original program data words to said microprocessor for operating said controller.

2. A controller as claimed in claim 1, wherein said converted program data words are scrambled program data words corresponding to said original program data words scrambled in accordance with said predetermined keyword, and said data converter comprises a modulo-2 adder for summing the predetermined keyword of said register with the scrambled program data words to produce said replica of original program data words.

3. A controller as claimed in claim 1, wherein said converted program data words in said read-only memory are divided into a plurality of data blocks each of which is a scrambled form of said original program data words with each of a plurality of keywords defined respectively for said data blocks, and wherein said data converter comprises keyword determining means for determining a particular keyword of said plurality of keywords corresponding to one of said data blocks, and a modulo-2 adder for summing the particular keyword with the scrambled program data words of the corresponding one of said data blocks to produce said replica of original program data words.

4. A controller as claimed in claim 3, wherein said register holds said particular keyword and portions of said read-only memory store the plurality of keywords, said microprocessor reading the particular keyword from said read-only memory into said register before reading the scrambled program data words of the corresponding one of said data blocks.

5. A controller as claimed in claim 1, wherein said converted program data words are scrambled program data words corresponding to said original program data words scrambled in accordance with each of a plurality of keywords, and wherein said data converter comprises:

keyword determining means for determining a particular keyword of said plurality of keywords correspond to a particular scrambled program data word of said scrambled program data words; and a modulo-2 adder for summing the particular keyword with the particular scrambled program data word to produce said replica of original program data words.

6. A controller as claimed in claim 5, wherein said keyword determining means comprises:

a second read-only memory for storing a plurality of scrambling words; and a second modulo-2 adder for summing a particular one of the scrambling words with the predetermined keyword in said register to produce said particular keyword.

7. A controller as claimed in claim 3, wherein said keyword determining means comprises:

a second read-only memory for storing a plurality of scrambling words; and a second modulo-2 adder for summing a particular one of the scrambling words with the predetermined keyword in said register to produce said particular keyword.

8. A controller comprising:

a microprocessor;

a read-only memory for storing scrambled program data words;

a random-access memory;

a data bus for transporting information signals between said microprocessor and said read-only memory and said random-access memory;

an address bus for transporting address signals from said microprocessor to said read-only memory and said random-access memory; and a data converter connected in said data bus for descrambling data words when said read-only memory is accessed through said address bus to produce a replica of original program data words and applying said replica to said microprocessor for operating said controller, and applying data words to said microprocessor without descrambling the data words when said random-access memory is accessed through said address bus.

9. A controller as claimed in claim 8, wherein the scrambled program data words in said read-only memory are divided into a plurality of data blocks each of which is a scrambled form of said original program data words with each of a plurality of keywords defined respectively for said data blocks, and wherein said data converter comprises keyword generating means for generating said keywords, and a modulo-2 adder for summing a corresponding one of the generated keywords with the scrambled program data words of a corresponding one of said data blocks to produce said replica of original program data words.

10. A controller as claimed in claim 9, wherein said keyword generating means comprises a register for storing one of said keywords and portions of said read-only memory for storing the other keywords, said microprocessor reading the corresponding one of the keywords from said read-only memory into said register before reading the scrambled program data words of the corresponding data block.

11. A controller as claimed in claim 10, wherein said keyword generating means comprises:

a register for storing an original keyword;

a second read-only memory for storing a plurality of scrambling words; and a second modulo-2 adder for summing a corresponding one of the scrambling words with the original keyword in said register to produce said corresponding one of the keywords.

12. A controller as claimed in claim 8, wherein said scrambled program data words in said read-only memory are a scrambled form of said original program data words with each of a plurality of keywords, and said data converter comprises keyword generating means for generating said keywords and a modulo-2 adder for summing a corresponding one of the generated keywords with the scrambled program data words to produce said replica of original program data words.

13. A controller as claimed in claim 12, wherein said keyword generating means comprises:

a register for storing an original keyword;

a second read-only memory for storing a plurality of scrambling words; and a second modulo-2 adder for summing a corresponding one of the scrambling words with the original keyword in said register to produce said corresponding one of the keywords.

14. A method for protecting a software program stored in a read-only memory from unauthorized access, comprising the steps of:

a) scrambling an original software program with a keyword;

b) storing the scrambled software program into the read-only memory;

c) reading the scrambled software program from the read-only memory; and d) descrambling the read software program with a replica of said keyword to produce a replica of said original software program, and supplying the replica of the original software program directly to a microprocessor.

15. A method for protecting a software program stored in a read-only memory from unauthorized access, comprising the steps of:

a) dividing an original software program into a plurality of data blocks;

b) scrambling each of the data blocks with a keyword corresponding to the data block;

c) storing each of the scrambled data blocks into the read-only memory;

d) reading each of the scrambled data blocks from the read-only memory;

e) generating a keyword corresponding to the read data block; and descrambling the read data block with the generated keyword to produce a replica of the data block of said original software program, and supplying said replica of the data block directly to a microprocessor.

* * * * *